(12) United States Patent
Nishizawa et al.

(10) Patent No.: US 6,764,760 B2
(45) Date of Patent: Jul. 20, 2004

(54) LABEL FOR IN-MOLD DECORATING AND LABELED RESIN MOLDED ARTICLE

(75) Inventors: Takatoshi Nishizawa, Ibaraki (JP); Masaki Shiina, Ibaraki (JP)

(73) Assignee: Yupo Corporation, Tokyo (JP)

(*) Notice: Subject to any disclaimer, the term of this patent is extended or adjusted under 35 U.S.C. 154(b) by 117 days.

(21) Appl. No.: 09/910,846

(22) Filed: Jul. 24, 2001

(65) Prior Publication Data

US 2002/0050319 A1 May 2, 2002

(30) Foreign Application Priority Data

Jul. 24, 2000 (JP) ..................................... P.2000-221735
Feb. 2, 2001 (JP) ..................................... P.2001-026954

(51) Int. Cl.$^7$ .............................. B32B 7/12; G09F 3/04
(52) U.S. Cl. ..................... 428/349; 428/354; 428/515; 428/517; 428/922; 264/173.16; 264/173.19
(58) Field of Search ............................... 428/349, 354, 428/922, 515, 517; 264/173.16, 173.19

(56) References Cited

U.S. PATENT DOCUMENTS

| | | | | |
|---|---|---|---|---|
| 4,780,364 A | * | 10/1988 | Wade et al. | 428/315.5 |
| 5,026,592 A | | 6/1991 | Janocha et al. | |
| 5,811,163 A | * | 9/1998 | Ohno et al. | 428/35.7 |
| 6,150,013 A | * | 11/2000 | Balaji et al. | 428/220 |
| 6,551,671 B1 | * | 4/2003 | Nishizawa et al. | 428/34.1 |
| 2001/0028952 A1 | * | 10/2001 | Nishizawa et al. | 428/336 |

FOREIGN PATENT DOCUMENTS

| | | |
|---|---|---|
| DE | 44 32 777 | 2/1996 |
| EP | 0 254 923 | 2/1988 |
| EP | 0 613 919 | 9/1994 |
| EP | 0 813 955 | 12/1997 |
| EP | 0 949 599 | 10/1999 |
| GB | 2 112 789 | 7/1983 |
| JP | 58-69015 | 4/1983 |
| JP | 58-118838 | 7/1983 |
| JP | 1-163234 | 6/1989 |
| JP | 2-7814 | 1/1990 |
| JP | 2-84319 | 3/1990 |
| JP | 3-62804 | 3/1991 |
| JP | 3-260689 | 11/1991 |
| JP | 6-313079 | 11/1994 |
| JP | 11-352888 | 12/1999 |
| WO | WO 92/01723 | 2/1992 |

* cited by examiner

*Primary Examiner*—Daniel Zirker
(74) *Attorney, Agent, or Firm*—Oblon, Spivak, McClelland, Maier & Neustadt, P.C.

(57) ABSTRACT

A label for in-mold decorating, which comprises (I) a thermoplastic resin film base layer, (II) an interlayer overlying said base layer and comprising (a) a thermoplastic resin composition, and (b) at least one antistatic agent, and (III) a heat-sealable resin layer overlying said interlayer. The label for in-mold decorating can be manufactured without developing a resin-like stain or causing roll contamination. It is free from inconveniences arising from insufficient antistatic properties in printing, cutting, blanking, and inserting into a mold, irrespective of the working environment. In addition, it exhibits a high adhesive strength upon application to a molded container.

29 Claims, 1 Drawing Sheet

LABEL FOR IN-MOLD DECORATING AND LABELED RESIN MOLDED ARTICLE

BACKGROUND OF THE INVENTION

1. Field of the Invention

This invention relates to a label for in-mold decorating, which is inserted into a mold in contact with the cavity wall to manufacture labeled containers. Preferable molding methods for in-mold decorating include blow molding of a thermoplastic resin hot parison, injection molding of a molten thermoplastic resin, and vacuum forming or pressure forming of a heat-softened thermoplastic resin sheet. The present invention also relates to a labeled resin molded article.

2. Discussion of the Background

In-mold decorating for producing a labeled container is carried out by inserting a label into a mold and molding a resin in the mold and forming into a container by injection molding, blow molding, differential pressure forming, foaming, and the like (see, e.g., JP-A-58-69015 and EP 254923). Known labels for use in in-mold decorating include gravure-printed resin films, multicolor offset-printed synthetic paper (see, e.g., JP-B-2-7814 and JP-A-2-84319), and aluminum labels composed of aluminum foil laminated with a high pressure processed low density polyethylene or an ethylene-vinyl acetate copolymer and having the aluminum foil gravure-printed.

When carrying out in-mold decorating with an automatic label feeder to feed a label to a prescribed position on the inner wall of a mold, if the labels do not have sufficient antistatic properties or if a stack of labels is not destaticized, particularly in a low humidity environment or in winter, the undesirable result is that two or more labels may be erroneously fed at one time, or a label is not fed to the right position, or a label falls uselessly.

Labels having insufficient antistatic properties are also accompanied by feeding difficulties in printing, particularly offset printing, which requires frequently suspending and resuming of the printing machine.

In order to eliminate the above-mentioned inconveniences, the following solutions have been proposed: (1) labels for in-mold decorating having a migrating low-molecular antistatic agent, such as sorbitan monooleate or glycerol monostearate, incorporated into the heat-sealable resin layer thereof typically comprising a polyethylene resin; and (2) labels for in-mold decorating having on the heat-sealable polyethylene resin layer thereof an antistatic coat of a low-molecular antistatic agent, such as a polyoxyethylene derivative, applied and dried.

The antistatic properties of both the proposed labels (1) and (2) have only a short duration, however. In addition, the labels (1) have the disadvantage that the antistatic agent in the heat-sealable resin layer migrates to the surface and thus considerably impairs the fusion bonding properties, resulting in generation of rejects, such as non-labeled containers and labeled containers of which the label has blisters.

To solve the problems it has been proposed to incorporate into a heat-sealable resin a polyether ester amide, which is a non-tacky, long-lasting antistatic agent (see JP-A-11-352888). The polyether ester amide, however, when incorporated into a heat-sealable resin and extruded through a T-die into a film, accumulates near the outlet of the T-die and deteriorates to form a considerable amount of so-called resin-like stain, or it accumulates dirt on the rolls in the production line that are in contact with the heat-sealable resin layer. Since such stains and dirt can cause film defects, the production line must be suspended frequently to clean the die or the rolls.

Accordingly, there is a great need for a label for in-mold decorating that avoids the above-mentioned problems.

SUMMARY OF THE INVENTION

Accordingly, one object of the present invention is to provide a label for in-mold decorating, which does not produce the above-mentioned resin-like stain.

Another object of the present invention is to provide a label for in-mold decorating which, does not contaminate the rolls in a label production line.

Another object of the present invention is to provide a label for in-mold decorating, which is free from inconveniences caused by insufficient antistatic properties in printing, cutting, blanking, and inserting into a mold irrespective of the working environment.

Another object of the present invention is to provide a label for in-mold decorating, which exhibits high adhesive strength.

Another object of the present invention is to provide a label for in-mold decorating, which exhibits high adhesive strength to containers.

These and other objects have now been attained by the present invention, the first embodiment of which provides a label for in-mold decorating, which includes:

(I) a thermoplastic resin film base layer;
(II) an interlayer overlying the base layer and including:
  (a) a thermoplastic resin composition, and
  (b) at least one antistatic agent; and
(III) a heat-sealable resin layer overlying the interlayer.

Another embodiment of the invention provides a labeled, resin molded article, which includes the above-mentioned label integrally adhered thereto by thermal fusion bonding.

Another embodiment of the invention provides a labeled, resin molded article, which includes the above-mentioned label.

Another embodiment of the invention provides a method for labeling, which includes placing the above-mentioned label into a mold, placing a moldable resin in the mold in contact with the label, and molding or forming the moldable resin into an article that includes the label.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Figure 1:
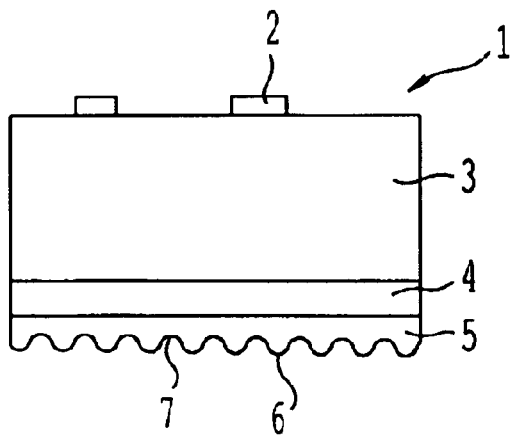
FIG. 1 is a cross-section of a label for in-mold decorating according to an embodiment of the present invention.

FIG. 1 is a cross-section of a label 1 for in-mold decoration according to an embodiment of the present invention. The label 1 shown is composed of a thermoplastic resin film base layer (I) having a printed layer 2, an interlayer (II), and a heat-sealable resin layer (III), the heat-sealable resin layer (III) having been embossed to prevent the label from blistering. The embossed pattern has a top portion 6 and a bottom portion 7.

Figure 2:
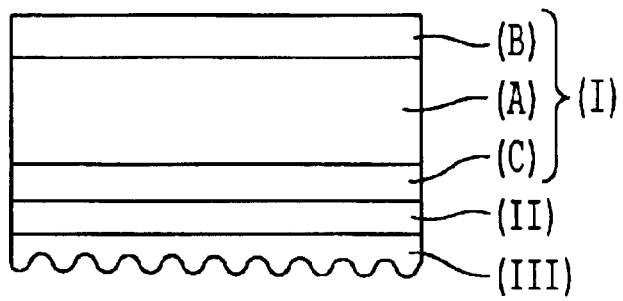
FIG. 2 is a cross-section of a label for in-mold decorating according to another embodiment of the present invention.

FIG. 2 is a cross-section of a label for in-mold decoration according to another embodiment of the present invention. In this embodiment, the thermoplastic resin film base layer (I) is composed of (B) a surface layer, (A) a core layer, and (C) a back layer, and the heat-sealable resin layer (III) has been embossed. The label further includes an interlayer (II) between the back layer (C) and the heat-sealable resin layer (III).

Figure 3:
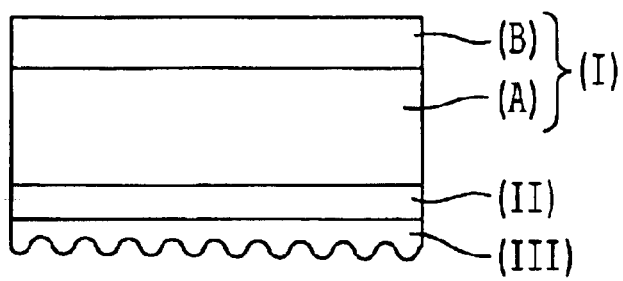
FIG. 3 is a cross-section of a label for in-mold decorating according to still another embodiment of the present invention.

FIG. 3 is a schematic cross-section of a label for in-mold decoration according to still another embodiment of the present invention. In this embodiment, the thermoplastic resin film base layer (I) is composed of (B) a surface layer and (A) a core layer, and the heat-sealable resin layer (III) has been embossed. The label further includes an interlayer (II) between the core layer (A) and the heat-sealable resin layer (III).

Preferably, the label of the present invention is a multilayer film including: (I) a thermoplastic resin film base layer; (II) an interlayer; and (III) a heat-sealable resin layer; wherein the interlayer (II) contains (a) thermoplastic resin composition and (b) an antistatic agent.

The heat-sealable resin layer (III) preferably has its surface embossed.

The antistatic agent present in the interlayer (II) preferably comprises, as a main component, a polyamide copolymer, particularly a polyether ester amide.

The thermoplastic resin composition of the interlayer (II) preferably contains (a) 50 to 95% by weight of a thermoplastic resin, (b) 5 to 35% by weight of a polyether ester amide, and (c) 0 to 10% by weight of a polyamide resin, in which component (a) is preferably a polyolefin resin.

The above range for the thermoplastic resin expressly includes 55, 60, 65, 70, 75, 80 and 85% by weight. The above range for the polyether ester amide expressly includes 10, 15, 20, 25 and 30% by weight. The above range for the polyamide resin expressly includes 1, 2, 3, 4, 5, 6, 7, 8, and 9% by weight.

It is preferred for the thermoplastic resin composition to further include (d) 0.01 to 5% by weight of a metal salt and/or (e) 0.5 to 10% by weight of an ionomer and/or (f) 1 to 20% by weight of modified low-molecular polyethylene.

The above range for the metal salt expressly includes 0.05, 0.1, 0.5, 1.0, 1.1, 1.5, 2, 3, 4 and 4.5%, The above range for the ionomer expressly includes 0.75, 1.0, 1.5, 2, 3, 4, 5, 6, 7, 8 and 9% by weight. The above range for the modified low-molecular polyethylene expressly includes 1.1, 2, 5, 7, 10, 12, 15, 16, 17, 18 and 19% by weight.

The heat-sealable resin layer (III) preferably includes a polyethylene resin having a crystallinity of 10 to 60%, a number average molecular weight of 10,000 to 40,000, and a melting point of 50 to 130° C.

The above range for the polyethylene resin crystallinity expressly includes 12, 15, 20, 25, 30, 35, 40, 45, 50, and 55% by weight. The above range for the number average molecular weight expressly includes 12,000, 15,000, 17,000, 20,000, 25,000, 30,000 and 35,000. The above range for the melting point expressly includes 55, 60, 65, 75, 85, 95, 100, 105, 110, 115, 120 and 125° C.

The interlayer (II) and the heat-sealable resin layer (III) each preferably have a thickness of 0.5 to 20 $\mu$m. This range expressly includes 0.75, 1.0, 1.1, 2, 5, 7, 10, 12, 15, 17 and 19 $\mu$m.

The label preferably has a surface resistivity of $1\times10^9$ to $1\times10^{14}$ $\Omega$/square on its heat-sealable resin layer (III) side. This range expressly includes $1\times10^{10}$, $1\times10^{11}$, $1\times10^{12}$, and $1\times10^{13}$.

The label (multilayer film) preferably contains at least one of an inorganic fine powder and an organic filler. Mixtures are possible.

It is particularly preferred that the base layer (I) is a stretched porous resin film containing at least one of an inorganic fine powder and an organic filler. Mixtures are possible.

Preferably, the invention also includes a labeled resin molded article having the above-described label integrally adhered thereto by thermal fusion bonding.

Thermoplastic Resin Film Base Layer (I):

The thermoplastic resin making the base layer (I) includes polyolefin resins, such as propylene resins, high density polyethylene, medium density polyethylene, poly(4-methylpentene-1), and an ethylene-cyclic olefin copolymer; polyamide resins, such as nylon-6, nylon-6,6, nylon-6,10, and nylon-6,12; polyethylene terephthalate resins, polyvinyl chloride resins, ABS resins, and ionomer resins. Preferred of these thermoplastic resins are those having a melting point of 130 to 280° C. This range expressly includes 140, 150, 180, 200, 220, 240 and 260° C. These resins can be used either individually or as a mixture of two or more thereof In using a mixed resin, it is preferred for the main resin to have a melting point higher than the heat-sealable resin making the heat-sealable resin layer (III) by 15° C. or more. This range expressly includes 20, 25, 30, 35, 40, 45 and 50° C. or more.

Propylene resins are particularly preferred for their chemical resistance and inexpensiveness. Specific examples of useful propylene resins are propylene homopolymers having isotactic or syndiotactic stereospecificity and copolymers including propylene as a main component and, as a secondary component, an $\alpha$-olefin, e.g., ethylene, butene-1, hexene-1, heptene-1 or 4-methylpentene-1. The propylene copolymers may be either random copolymers or block copolymers.

Films made of a composition including the thermoplastic resin and at least one of an inorganic fine powder and an organic filler, uniaxially or biaxially stretched films made of the composition, films of the thermoplastic resin which are coated with a latex containing an inorganic filler, and films of the thermoplastic resin having an aluminum layer deposited thereon or bonded thereto are suitably used as a base layer (I).

The inorganic fine powder and the organic filler which can be added to the thermoplastic resin film base layer (I) are not particularly limited. Examples of useful inorganic fine powder include fine powder of heavy calcium carbonate, light precipitated calcium carbonate, calcined clay, talc, barium sulfate, diatomaceous earth, magnesium oxide, zinc oxide, titanium oxide, and silicon oxide. Mixtures are possible. Preferred of them are heavy calcium carbonate, calcined clay and talc for inexpensiveness and satisfactory moldability.

Examples of useful organic fillers include polyethylene terephthalate, polybutylene terephthalate, polyamide, polycarbonate, polyethylene naphthalate, polystyrene, melamine resins, polyethylene sulfite, polyimide, polyethyl ether ketone, polyphenylene sulfite, poly(4-methylpentene-1), polymethyl methacrylate, a cyclic olefin homopolymer, and a cyclic olefin-ethylene copolymer. Mixtures are possible. These organic fillers preferably have a melting point of 120 to 300° C. or a glass transition point of 120 to 280° C. The range for the melting point expressly includes 130, 150, 175, 200, 225, 250 and 275° C.; and the range for the glass transition point expressly includes 140, 150, 170, 200, 220, 240, 260 and 270° C.

The thermoplastic resin film base layer (I) has a single layer structure, a double layer structure composed of (A) a core layer and (B) a surface layer, a three-layer structure composed of (A) a core layer, (B) a surface layer and (C) a back layer, or a multilayer structure having an additional resin film layer between the surface layer (B) and the core layer (A) and/or between the core layer (A) and the back layer (C). The base layer (I) may be either a non-stretched film or a uniaxially or biaxially stretched film. The stretching directionality of each layer constituting a stretched three-layered film may be uniaxial/uniaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial or biaxial/biaxial/biaxial. A stretched multilayer film composed of four or more layers can have arbitrarily combined stretching directions.

From the standpoint of dimensional stability on printing, suitability for label feeding into a mold and resistance to thermal shrinkage, the base layer (I) preferably includes (i) a three-layer laminate film composed of (A) a biaxially stretched film core layer of a resin composition including 5 to 30% by weight of inorganic fine powder, 0 to 20% by weight of high density polyethylene, and 50 to 95% by weight of a propylene resin, (B) a uniaxially stretched film surface layer of a resin composition including 15 to 65% by weight of inorganic fine powder, 0 to 10% by weight of high density polyethylene, and 25 to 85% by weight of a propylene resin, which is provided on one side of the core layer (A), and (C) a uniaxially stretched film back layer of a resin composition including 15 to 65% by weight of inorganic fine powder, 0 to 10% by weight of high density polyethylene and 25 to 85% by weight of a propylene resin, which is provided on the other side of the core layer (A) (see FIG. 2) and (ii) a double layer laminate film composed of (A) a uniaxially stretched film core layer of a resin composition including to 5 to 45% by weight of inorganic fine powder, 0 to 20% by weight of high density polyethylene and 35 to 95% by weight of a propylene resin and (B) a uniaxially stretched film surface layer of a resin composition including 15 to 65% by weight of inorganic fine powder, 0 to 10% by weight of high density polyethylene and 25 to85% by weight of a propylene resin, which is provided on one side of the core layer (A) (see FIG. 3).

Where transparency is required of the label to make the container visible, the base layer (I) preferably includes (iii) a laminate film composed of (A) a biaxially stretched film core layer of a resin composition including 0 to 5% by weight of inorganic fine powder, 0 to 20% by weight of a high density polyethylene and 75 to 100% by weight of a propylene resin, (B) a uniaxially stretched film surface layer of a resin composition including 0 to 30% by weight of inorganic fine powder, 0 to 10% by weight of high density polyethylene and 60 to 100% by weight of a propylene resin, which is provided on one side of the core layer (A) and (C) a uniaxially stretched film back layer of a resin composition including 0 to 30% by weight of inorganic fine powder, 0 to 10% by weight of high density polyethylene and 60 to 100% by weight of a propylene resin, which is provided on the other side of the core layer (A) (see FIG. 2) and (iv) a laminate film composed of (A) a uniaxially stretched film core layer of a resin composition including 0 to 5% by weight of inorganic fine powder, 0 to 20% by weight of a high density polyethylene and 75 to 100% by weight of a propylene resin and (B) a uniaxially stretched film surface layer of a resin composition including 0 to 30% by weight of inorganic fine powder, 0 to 10% by weight of high density polyethylene and 60 to 100% by weight of a propylene resin, which is provided on one side of the core layer (A) (see FIG. 3).

The printed layer can be provided on the surface or the back of the surface layer (B), the surface or the back of the core layer (A) or the surface or the back of the back layer (C).

The interlayer (II) and the heat-sealable layer (III) are provided on the back layer (C) side in the case of FIG. 2 or on the core layer (A) side in the case of FIG. 3.

The base layer (I) preferably has a density of 0.65 to 1.10 g/cm$^3$, particularly 0.70 to 1.00 g/cm$^3$, especially 0.74 to 0.96 g/cm$^3$, and a thickness of 20 to 250 $\mu$m, particularly 40 to 200 $\mu$m. A label of which the base layer (I) is thinner than 20 $\mu$m tends to be difficult to set at a right position in a mold with a label feeder or tends to wrinkle. A label of which the base layer (I) is thicker than 250 $\mu$m tends to have reduced adhesive strength to a container, and the resulting labeled container may have poor impact strength in a drop test.

Where the base layer (I) has a multilayer structure, the core layer (A) preferably has a thickness of 19 to 170 $\mu$m, particularly 38 to 130 $\mu$m, the surface layer (B) preferably has a thickness of 1 to 40 $\mu$m, particularly 2 to 35 $\mu$m, and the back layer (C) preferably has a thickness of up to 40 $\mu$m, particularly up to 35 $\mu$m.

Interlayer (II):

The interlayer (II) includes at least (a) a thermoplastic resin and (b) an antistatic agent.

The thermoplastic resin (a) which constitutes the interlayer (II) preferably includes polyethylene resins having a melting point of 50 to 130° C., such as high density polyethylene having a density of 0.940 to 0.970 g/cm$^3$, high pressure processed low to medium density polyethylene having a density of 0.900 to 0.935 g/cm$^3$, linear polyethylene having a density of 0.880 to 0.940 g/cm$^3$, an ethylene-vinyl acetate copolymer, an ethylene-acrylic acid copolymer, an ethylene-alkyl acrylate copolymer, an ethylene-alkyl methacrylate (having 1 to 8 carbon atoms in the alkyl moiety) copolymer, an ethylene-methacrylic acid copolymer metal salt (e.g., a salt with Zn, Al, Li, K or Na). Still preferred are high pressure processed polyethylene or linear polyethylene having a crystallinity of 10 to 60% (as measured by an X-ray method) and a number average molecular weight of 10,000 to 40,000. Particularly preferred for adhesion to containers is linear polyethylene obtained by copolymerizing 40 to 98% by weight of ethylene and 2 to 60% by weight of an α-olefin having 3 to 30 carbon atoms in the presence of a metallocene catalyst, especially a metallocene-aluminoxane catalyst or a catalyst system including a metallocene compound and a compound capable of reacting with the metallocene compound to form a stable anion (such a catalyst system is disclosed in WO92/01723, the entire contents of which are hereby incorporated by reference). These polyethylene resins can be used either individually or as a mixture of two or more thereof.

The content of the thermoplastic resin (a) in the interlayer (II) ranges usually from 45 to 95% by weight, preferably from 55 to 92% by weight. These ranges expressly include 50, 60, 65, 70, 75, 80, 85, 90 and 91% by weight.

The antistatic agent (b) which can be used in the interlayer (II) is believed to act through a mechanism different from that of migrating low-molecular antistatic agents customarily employed. That is, the conventional antistatic agents bleed out on the surface of a thermoplastic resin layer to make its hydrophilic groups adsorb moisture in air to conduct ions thereby developing antistatic properties, while the antistatic agent used in the invention is an ion-conducting high-molecular weight compound which is believed to form a network in a thermoplastic resin to exhibit antistatic properties. Such high-molecular antistatic agents preferably include those mainly including a polyamide copolymer, particularly those mainly including a polyether ester amide. Processes of preparing antistatic agents of non-migrating type are disclosed in JP-A-58-118838, JP-A-1-163234, and JP-A-6-313079, the entire contents of each of which being hereby incorporated by reference.

One of the components preferably constituting the polyether ester amide is (i) an aminocarboxylic acid or lactam having 6 or more carbon atoms or a salt of a diamine having 6 or more carbon atoms and a dicarboxylic acid. The aminocarboxylic acid preferably includes ω-aminocaproic acid, ω-aminoenanthic acid, ω-aminocaprylic acid, ω-aminopelargonic acid, ω-aminocapric acid, 11-aminoundecanoic acid and 12-aminododecanoic acid. The lactam preferably includes caprolactam, ethantholactam, caprylolactam and laurolactam. The diamine-dicarboxylic acid salt preferably includes hexamethylenediamine adipate, hexamethylenediamine sebacate, and hexamethylenediamine isophthalate. In particular, caprolactam, 12-aminododecanoic acid, and hexamethylenediamine adipate are preferred as component(i).

Another component constituting the polyether ester amide is (ii) a poly(alkylene oxide) glycol, such as polyethylene glycol, poly(1,2-propylene oxide) glycol, poly(1,3-propylene oxide) glycol, poly(tetramethylene oxide) glycol, poly(hexamethylene oxide) glycol, an ethylene oxide-propylene oxide block or random copolymer, and an ethylene oxide-tetrahydrofuran block or random copolymer. Preferred of them is polyethylene glycol for obtaining excellent antistatic properties. Component (ii) preferably has a number average molecular weight of 200 to 6,000, particularly 250 to 4,000. A polyether ester amide obtained by using component (ii) whose number average molecular weight is less than 200 has poor mechanical properties. If the number average molecular weight of component (ii) exceeds 6,000, the resulting polyether ester amide has insufficient antistatic performance.

Still another component of the polyether ester amide is (iii) a dicarboxylic acid having 4 to 20 carbon atoms. This range expressly includes 5, 6, 8, 10, 12, 15, 16, 18 and 19 carbon atoms. Component (iii) preferably includes aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, and sodium 3-sulfoisophthalate; alicyclic dicarboxylic acids such as 1,4-cyclohexanedicarboxylic acid, 1,2-cyclohexanedicarboxylic acid, and dicyclohexyl-4,4'-dicarboxylic acid; and aliphatic dicarboxylic acids such as succinic acid, oxalic acid, adipic acid, sebacic acid, and decanedicarboxylic acid; with terephthalic acid, isophthalic acid, 1,4-cyclohexanedicarboxylic acid, adipic acid, sebacic acid, and decanedicarboxylic acid being preferred for their polymerizability and the color and physical properties of the resulting polymer.

Although the poly(alkylene oxide) glycol (ii) and the dicarboxylic acid (iii) react at an equimolar ratio theoretically, the ratio of these components to be charged is varied according to the kind of the dicarboxylic acid.

Components (ii) and (iii) making up a polyether ester are used in a total amount of 10 to 90% by weight based on the polyether ester amide. It their total amount is more than 90% by weight, the polyether ester amide has poor mechanical properties. If it is less than 10% by weight, the resulting polymer has insufficient antistatic properties. This range expressly includes 15, 20, 25, 30, 40, 45, 50, 60, 70 and 80% by weight.

The manner of polymerization to prepare the polyether ester amide is not particularly restricted.

For example, the following methods can be followed.

(1) Components (i) and (iii) are allowed to react with each other to prepare a polyamide prepolymer having a carboxyl group at both ends, which is allowed to react with component (iii) in vacuo.

(2) All the components (i), (ii) and (iii) are charged into a reactor and allowed to react at high temperature in the presence or absence of water to produce a carboxyl-terminated polyamide prepolymer, which is further polymerized under normal pressure or reduced pressure.

(3) All the components (i), (ii) and (iii) are charged into a reactor and mixed in a molten state and allowed to polymerize rapidly in a high degree of vacuum.

The catalyst for polymerization is not limited, either. Examples of suitable catalysts are antimony catalysts such as antimony trioxide, tin catalysts such as monobutyltin oxide, titanium catalysts such as titanium tetrabutoxide, and zirconium catalysts such as zirconium tetrabutoxide. These catalysts can be used either individually or as a combination of two or more thereof.

The content of the polyether ester amide (b) in the interlayer (II) is in a range usually of from 5 to 35% by weight, preferably 6 to 30% by weight. If the content of component (b) is less than 5%, the antistatic properties are insufficient. If it is more than 35%, the label has low adhesion to containers. These ranges expressly include 10, 15, 20 and 25% by weight.

In order to ensure stable development of antistatic properties, the resin composition for making the interlayer (II) may further include (c) a polyamide resin, such as a ring-opening polymer of a lactam having 6 to 12 or even more carbon atoms, a polycondensate of an aminocarboxylic acid having 6 to 12 or even more carbon atoms, or a polycondensate of a dicarboxylic acid having 4 to 20 carbon atoms and a diamine having 6 to 12 or even more carbon atoms. Examples of suitable polyamide resin (c) are nylon 66, nylon 69, nylon 610, nylon 612, nylon 6, nylon 11, nylon 12, and nylon 46. Copolyamides, such as nylon 6/66, nylon 6/10, nylon 6/12, and nylon 6/66/12, are useful as well. Also employable are aromatic group-containing polyamides obtained from an aromatic dicarboxylic acid (e.g., terephthalic acid or isophthalic acid) and m-xylenediamine or an aliphatic diamine. Particularly preferred of them are nylon 66, nylon 6, and nylon 12.

The content of the polyamide resin (c) in the interlayer (II) is usually 0 to 10% by weight, preferably 0 to 8% by weight. If added in amounts exceeding 10%, the polyamide resin (c) tends to impair the label adhesion to containers. These ranges expressly include 1, 2, 3, 4, 5, 6, 7, and 9% by weight.

The resin composition forming the interlayer (II) may further include (d) a metal salt. The metal of the metal salt (d) includes Li, Na, K, Rb, Cs, Be, Mg, Ca, Sr, Ba, Ti, Zr, Mn, Fe, Co, Ni, Cu, Zn, and Al, with Na, Ca, Mg, Zn, Zr, and Al being preferred. Mixtures of metals and salts are possible.

The metal salt includes nitrates, sulfates, acetates, chlorates, perchlorates, carbonates, oxalates, silicates, phosphates, borates, halides, thiocyanates, hydroxides, and oxides. Perchlorates, hydroxides, phosphates, acetates, oxides, carbonates and silicates are preferred. Specific examples of suitable metal salts are sodium chlorate, sodium perchlorate, calcium hydroxide, magnesium hydroxide, aluminum hydroxide, zinc hydroxide, zirconium hydroxide, sodium phosphate, calcium oxide, magnesium oxide, aluminum oxide, zinc oxide, calcium carbonate, basic calcium carbonate, magnesium carbonate, basic magnesium carbonate, aluminum carbonate, zinc carbonate, potassium silicate, sodium silicate, calcium silicate, and magnesium silicate. Preferred are sodium chlorate, sodium perchlorate, calcium hydroxide, magnesium hydroxide, zirconium hydroxide, calcium oxide, magnesium oxide, and sodium phosphate.

The content of the metal salt (d) in the interlayer (II) is usually 0.01 to 5% by weight, preferably 0.1 to 3% by weight. Addition of more than 5% of the metal salt (d) will reduce the label adhesion to a container. These ranges expressly include 0.05, 1, 2, and 4% by weight.

The resin composition for making the interlayer (II) may further include (e) an ionomer resin. The ionomer resin (e) which can be used here is an ionic polymer including an ethylene-$\alpha,\beta$-unsaturated carboxylic acid (or a derivative thereof) copolymer having introduced therein ionic bonds of a mono- to trivalent metal. The $\alpha,\beta$-unsaturated carboxylic acid and a derivative thereof include acrylic acid, methacrylic acid, itaconic acid, maleic acid, ethyl acrylate, isobutyl acrylate, methyl methacrylate, and methylmaleic acid. The mono- to trivalent metal ions include $Na^+$, $K^+$, $Mg^{++}$, $Zn^{++}$ and $Al^{+++}$. Various commercial ionomer resins available under trade names of Surlyn and Himilan can be made use of.

Ethylene-based ionomer resins containing Zn ions are preferred because they markedly improve affinity between the polyether ester amide and a polyolefin resin to ensure the mechanical characteristics of the resin composition. Ethylene-based ionomer resins containing Na ions are preferred, for they improve the antistatic properties of the resin composition. Ethylene-based ionomer resins containing Na ions and at least one other kind of metal ions, such as Zn ions and mixtures of an ethylene-based ionomer resin containing Na ions and an ethylene-based ionomer resin containing a different kind of metal ions, such as Zn ions, are particularly preferred for securing both excellent mechanical characteristics and the antistatic performance of the resin composition.

The content of the ionomer (e) in the interlayer (II) is usually 0.5 to 20% by weight, preferably 1 to 15% by weight. Addition of more than 20% of component (e) reduces the label adhesion to a container. These ranges expressly include 1.5, 2, 3, 5, 7, 9, 11, 13, 16 and 18% by weight.

The resin composition for the interlayer (II) can further include (f) modified low-molecular polyethylene. The modified low-molecular polyethylene (f) serves as a compatibilizer between the thermoplastic resin (a) and the antistatic agent (b). Component (f) includes low-molecular polyethylene containing at least one group selected from a hydroxyl group, a carboxyl group, a carboxylic acid anhydride group, an oxyalkylene group, an epoxy group, and an amino group per molecule. Component (f) is preferably (f1) modified low-molecular polyethylene having a number average molecular weight of 800 to 25,000, preferably 1,000 to 20,000, and an acid value of 5 to 150, preferably 10 to 100, (f2) modified low-molecular polyethylene having a number average molecular weight of 850 to 28,000, preferably 1,000 to 20,000, which is prepared by further modifying the modified low-molecular polyethylene (f1) by displacing a part or the whole of the carboxylic acid (or anhydride) unit with an alkanolamine and/or a hydroxyl- or amino-containing polyoxyalkylene compound, or a mixture of (f1) and (f2).

The modified low-molecular polyethylene (f1) is obtained by allowing low-molecular polyethylene having a number average molecular weight of 700 to 20,000, which is prepared by polymerization of ethylene or thermal degradation of high-molecular polyethylene, to react with an α,β-unsaturated carboxylic acid and/or an anhydride thereof in the presence or absence of an organic peroxide by a solution method or a melting method. For ease of modification, low-molecular polyethylene obtained by thermal degradation is preferably used as starting polyethylene. Thermal degradation of high-molecular polyethylene is described, e.g., in JP-A-3-62804, the entire contents of which are hereby incorporated by reference.

The α,β-unsaturated carboxylic acid and the anhydride thereof which can be used for modification include (meth)acrylic acid, maleic acid (and its anhydride), fumaric acid, itaconic acid (and its anhydride), and citraconic anhydride, with maleic anhydride being particularly preferred.

The α,β-unsaturated carboxylic acid or the anhydride thereof is used in an amount of 1 to 25% by weight, preferably 3 to 20% by weight, based on the weight of the starting low-molecular polyethylene. These ranges expressly include 2, 5, 8, 10, 15, 18, 22 and 24% by weight.

If the number average molecular weight of the modified low-molecular polyethylene (f1) is less than 700, the resulting label has poor suitability to label feed and discharge. If it is more than 20,000, the compatibilizing effect is lessened. This range expressly includes 900, 1,000, 5,000, 8,000, 10,000, 15,000 and 18,000.

If the acid value of the modified low-molecular polyethylene (f1) is less than 5, the compatibilizing effect is insufficient. If it is more than 150, the polymer has a deteriorated hue, which can cause coloration of the interlayer layer (II). This range expressly includes 10, 25, 50, 75, 100 and 125.

The modified low-molecular polyethylene (f2) is prepared by further modification (imidation or esterification) of the modified low-molecular polyethylene (f1) by displacing a part or the whole of the carboxylic acid (or anhydride) unit with an alkanolamine and/or a hydroxyl- or amino-containing polyoxyalkylene compound. The alkanolamine includes monoethanolamine, monoisopropanolamine, diethanolamine and diisopropanolamine, with monoethanolamine being preferred.

The hydroxyl- or amino-containing polyoxyalkylene compound includes compounds having a hydroxyl group at both ends thereof, such as polyethylene glycol and polypropylene glycol; these hydroxyl-containing compounds with their hydroxyl end groups displaced with amino groups or epoxy groups; and polyalkylene compounds basically having a hydroxyl group at one end thereof which are alkylene oxide-adducts of compounds having active hydrogen, such as alcohols (e.g., methanol, ethanol, butanol, octanollauryl alcohol, and 2-ethylhexyl alcohol) and phenols (e.g., phenol, alkylphenols, naphthol, phenylphenol and benzylphenol). The polyoxyalkylene compound usually has a molecular weight of 300 to 5,000.

While not limiting, the degree of the modification with the alkanolamine or the polyoxyalkylene compound is preferably such that 10 to 100 mol % of the carboxylic acid (or anhydride) unit of the polyethylene (f1) is imidated or esterified. If the number average molecular weight of (f2) is less than 850, the label feed and discharge suitability is reduced. If it is more than 28,000, the compatibilizing effect is reduced.

The modified low-molecular polyethylenes (f1) and (f2) can be used either individually or as a combination thereof. Modified low-molecular polyethylene having all of a carboxyl group, a hydroxyl group and a polyoxyalkylene group in the molecule is effective as well.

The content of component (f) in the interlayer (II) is usually 1 to 20% by weight, preferably 3 to 15% by weight. Out of this range, the label is less fusion-bondable. These ranges expressly include 2, 5, 8, 12, 14, 16 and 18% by weight.

If desired, the resin composition for forming the interlayer (II) can contain known additives as arbitrarily as is consistent with antistatic properties. Useful additives include dyes, nucleating agents, plasticizers, releasing agents, antioxidants, flame retardants, and ultraviolet absorbers. Mixtures are possible.

The interlayer (II) has a thickness of 0.5 to 20 $\mu$m, preferably 1 to 5 $\mu$m. A thickness of at least 1 $\mu$m is desirable for stable manifestation of the antistatic properties. A thickness exceeding 5 $\mu$m not only involves useless consumption of the antistatic agent but tends to cause the label to curl, which makes offset printing on the label and fixing the label in a mold difficult. These ranges expressly include 1.5, 2, 3, 6, 8, 10, 15 and 18 $\mu$m.

Heat-Sealable Resin Layer (III):

The heat-sealable resin which constitutes the heat-sealable resin layer (III) preferably includes polyethylene resins having a melting point of 50 to 130° C., such as high pressure processed low to medium density polyethylene having a density of 0.900 to 0.935 g/cm$^3$, linear polyethylene having a density of 0.880 to 0.940 g/cm$^3$, an ethylene-vinyl acetate copolymer, an ethylene-acrylic acid copolymer, an ethylene-alkyl acrylate copolymer, an ethylene-alkyl methacrylate (having 1 to 8 carbon atoms in the alkyl moiety) copolymer, an ethylene-methacrylic acid copolymer metal salt (e.g., a salt with Zn, Al, Li, K or Na). Preferred are high pressure processed polyethylene or linear polyethylene having a crystallinity of 10 to 60% (as measured by an X-ray method) and a number average molecular weight of 10,000 to 40,000. Still preferred for adhesion to containers is linear polyethylene obtained by copolymerizing 40 to 98% by weight of ethylene and 2 to 60% by weight of an α-olefin having 3 to 30 carbon atoms in the presence of a metallocene catalyst, especially a metallocene-aluminoxane catalyst or a catalyst system including a metallocene compound and a compound capable of reacting with the metallocene compound to form a stable anion (such a catalyst system is disclosed in WO92/01723, the entire contents of which are hereby incorporated by reference). These polyethylene resins can be used either individually or as a mixture of two or more thereof.

If desired, the heat-sealable resin can contain known additives arbitrarily as long as heat sealability is not impaired. Useful additives include dyes, nucleating agents, plasticizers, releasing agents, antioxidants, flame retardants, and ultraviolet absorbers. Mixtures are possible.

The heat-sealable resin layer (III) has a thickness of 0.5 to 20 μm, preferably 1 to 5 μm. A thickness of at least 1 μm is desirable for preventing accumulation of resin-like stain on the T-die or roll contamination in label production and for securing fusion bonding to a container by the heat of a hot parison or a molten molding resin (e.g., polyethylene or polypropylene) in in-mold decorating. A thickness exceeding 5 μm tends to cause the label to curl, which makes offset printing on the label and fixing the label in a mold difficult. These ranges expressly include 1.5, 2, 3, 4, 6, 8, 10, 15 and 18 μm.

The surface resistivity of the heat-sealable resin layer (III) ranges from $1 \times 10^9$ to $1 \times 10^{14}$ Ω/square preferably from $1 \times 10^9$ to $1 \times 10^{13}$ Ω/square. With a surface resistivity exceeding $1 \times 10^{14}$ Ω/square, the label has insufficient antistatic properties and poor suitability to label feeding in offset printing or insertion into a mold.

In order to prevent blistering in blow molding, the heat-sealable resin layer (III) is preferably subjected to embossing as taught in JP-A-2-84319 and JP-A-3-260689, the entire contents of each of which being hereby incorporated by reference. The embossed pattern preferably includes, for example, 5 to 200 lines per inch (2.54 cm). Inverted gravure patterns are preferred.

If desired, the printability of the base layer (I) of the label is improved by a corona discharge treatment or a like surface treatment. Various pieces of information, such as a bar code, the names of a manufacture and a seller, a character, the name of a product, directions for use, etc. are printed on the label by gravure printing, offset printing, flexographic printing, screen printing and the like.

The printed label is blanked into desired shape and size. The label for in-mold decorating can be provided on a part of a container, for example, the front side and/or the rear side of a blown bottle or, usually, on the whole circumference of a cup container.

In-mold decorating by use of the label of the invention by differential pressure forming is carried out as follows. The label is set at a prescribed position in a lower cavity with its printed side in contact with the inner wall of the cavity and held by suction. A softened resin sheet is placed on the cavity and formed into a container by making use of a pressure difference to produce a labeled container. Differential pressure forming includes vacuum forming and pressure forming. In general, a combination of vacuum forming and pressure forming with plug assist is adopted. The label of the invention is also suited to in-mold decorating by blow molding, in which a hot parison is blown onto the inner wall of a mold. Since the label is fixed to a mold before a resin is molded or formed in the mold into a container, the label undergoes no deformation and exhibits high adhesive strength to the container to provide a labeled container having a satisfactory appearance with no blisters.

EXAMPLES

Having generally described this invention, a further understanding can be obtained by reference to certain specific examples which are provided herein for purposes of illustration only and are not intended to be limiting unless otherwise specified. Accordingly, the amounts or ratios of materials used in the examples, the operations followed in the examples, and the like can be modified within the scope of the present invention. All the parts and percents are given by weight unless otherwise noted.

Physical properties and performance properties were measured and evaluated in accordance with the following methods.

(1) MFR
    Measured in accordance with JIS K7210.
(2) Density
    Measured in accordance with JIS K7112.
(3) Opacity
    Measured in accordance with JIS P8138.
(4) Surface Resistivity
    Measured on the heat-sealable resin layer (III) side in an atmosphere of 20° C. and 50% RH.
(5) Suitability to Insertion into Mold
    A label blanked into a size of 70 mm by 90 mm was fed into a split mold for blow molding by use of an automatic label feeder supplied by Pentel Co., Ltd., and blow molding was carried out. Suitability to insertion into the mold was evaluated by the number of failures in label feeding (double feeding or fall from the mold) that occurred in making consecutive 100 shots and rated on an A-to-C scale.
    A . . . No failures occurred.
    B . . . One to five failures occurred.
    C . . . Six or more failures occurred.
(6) Adhesive Strength
    A 15 mm wide strip specimen for a peel test was cut out of the labeled portion of a labeled blown container, and the peel strength of the label was measured with a tensile tester Autograph AGS-D, supplied by Shimadzu Corp. at a peel angle of 180□ and a pull speed of 300 mm/min. Alleged standards for evaluating practicality of labels are:
    Peel strength higher than 400 g/15 mm . . . No problem for practical use
    Peel strength of 200 to 400 g/15 mm . . . Slightly weak but acceptable for practical use
    Peel strength lower than 200 g/15 mm . . . Problematical for practical use
(7) Suitability to Feeding in Offset Printing
    A thousand sheets of labels 636 mm wide and 470 mm long were continuously printed on a printer Dia-II supplied by Mitsubishi Heavy Industries, Ltd. at a speed of 7000 sheets/hour at 25° C. and 40% RH. Suitability of feeding in printing was evaluated by the number of troubles (double feeding or positional deviation) on the sheet feeder that stopped the printing machine and rated on an A-to-C scale.
    A . . . The machine did not stopped at all.
    B . . . The machine stopped one to three times.
    C . . . The machine stopped 4 times or more.
(8) Production of Resin-like Stain
    Production of resin-like stain in the label production which dropped on the film to make the film defective was observed and rated on an A-to-C scale.
    A . . . Production of resin-like stain was not observed in 6 hours from the start of label production.
    B . . . Resin-like stain began to grow in one hour from the start of label production and dropped at an interval of 5 to 10 minutes.
    C . . . Resin-like stain began to grow from the very beginning of label production and dropped at an interval of 1 to 5 minutes.

Preparation Example 1
Preparation of Antistatic Agent:

In a reactor equipped with a helical ribbon stirring blade were charged 55 parts of 12-aminododecanoic acid, 40 parts of polyethylene glycol having a number average molecular weight of 1,000, 15 parts of adipic acid, 0.2 part of Irganox 1098 (antioxidant), and 0.1 part of an antimony trioxide catalyst. The atmosphere was displaced with nitrogen, and the mixture was stirred at 260° C. for 60 minutes to prepare a clear homogeneous solution. The system was allowed to polymerize at 260° C. under reduced pressure of 0.5 mmHg for 4 hours to obtain clear and viscous polyether ester amide (b1), which was spouted on a chilling belt in strings and cut into pellets.

Preparation Example 2
Preparation of Antistatic Agent:

In the same reactor as used in Preparation Example 1 were charged 50 parts of ε-caprolactam, 40 parts of polyethylene glycol having a number average molecular weight of 1,000, 10 parts of decanedicarboxylic acid, 0.2 part of Irganox 1098 (antioxidant), and 0.02 part of antimony trioxide. The atmosphere was displaced with nitrogen, and the mixture was stirred at 260° C. for 60 minutes to prepare a clear homogeneous solution. The inner pressure was reduced to 500 mmHg to remove the water content in the gaseous phase, and 0.08 part of zirconium tetrabutoxide was added to the mixture. The system was allowed to polymerize at 260° C. under reduced pressure of 0.5 mmHg for 3 hours to obtain clear and viscous polyether ester amide (b2), which was pelletized in the same manner as for b1.

Preparation Example 3
Preparation of Antistatic Agent:

In the same reactor as used in Preparation Example 1 were charged 110 parts of 12-aminododecanoic acid, 16.3 parts of adipic acid, 0.3 part of Irganox 1010 (antioxidant), and 7 parts of water. The atmosphere was displaced with nitrogen, and the mixture was stirred at 220° C. for 4 hours under pressure in a closed system to obtain 117 parts of a polyamide oligomer carrying a carboxyl group at both terminals and having an acid value of 107. To the reaction mixture were added 225 parts of bisphenol A ethylene oxide adduct having a number average molecular weight of 2,000 and 0.5 part of zirconyl acetate. The mixture was allowed to polymerize at 245° C. under reduced pressure of 1 mmHg or lower for 5 hours to obtain clear and viscous polyether ester amide (b3), which was pelletized in the same manner as for b1.

Example 1
(1) Preparation of Core Layer (A)

A resin composition (A) consisting of 67% of propylene homopolymer Novatec PP MA-8, available from Japan Polychem Corporation (melting point: 164° C.), 10% of high density polyethylene Novatec HD HJ580, available from Japan Polychem Corporation (melting point: 134° C.; density: 0.960 g/cm$^3$) and 23% of calcium carbonate powder having a particle size of 1.5 µm was melt-kneaded in an extruder and extruded from a T die at 250° C. into a sheet. The extruded sheet was chilled to about 50° C.

The sheet was heated to about 153° C. and longitudinally stretched four times by means of rolls having different peripheral speeds to obtain a uniaxially stretched film (A).

(2) Preparation of Surface Layer (B)/Core Layer (A) Laminate

A resin composition (B) consisting of 51.5% of propylene homopolymer Novatec PP MA-3, available from Japan Polychem Corporation (melting point: 165° C.), 3.5% of high density polyethylene HJ580 (density: 0.950 g/cm$^3$), 42% of calcium carbonate powder having a particle size of 1.5 µm, and 3% of titanium oxide powder having a particle size of 0.8 µm as melt-kneaded in an extruder at 240° C. and extruded from a T die into a sheet on the uniaxially stretched film (A) to obtain a surface layer (B)/core layer (A) laminate.

(3) Preparation of Pellets for Interlayer (II)

A mixture of 60% of an ethylene-1-hexene copolymer prepared by copolymerizing ethylene and 1-hexene in the presence of a metallocene catalyst (1-hexene content: 22%; MFR: 18 g/10 min; density: 0.898 g/cm$^3$; melting point: 90° C.; crystallinity: 30%; number average molecular weight: 23,000) and 30% of high pressure processed low density polyethylene (MFR: 4 g/10 min; density: 0.92 g/cm$^3$; melting point: 110° C.) was dry blended with 9.5% of polyether ester amide (b1) prepared in Preparation Example 1 and 0.5% of sodium perchlorate in a tumbling mixer for 3 minutes. The blend was melt-kneaded in a vented twin-screw extruder set at 230° C., extruded into strands, and cut into pellets.

(4) Preparation of Pellets for Heat-sealable Layer Resin (III)

An ethylene-1-hexene copolymer prepared by copolymerizing ethylene and 1-hexene in the presence of a metallocene catalyst (1-hexene content: 22%; MFR: 18 g/10 min; density: 0.898 g/cm$^3$; melting point: 90° C.; crystallinity: 30%; number average molecular weight: 23,000) and high pressure processed low density polyethylene (MFR: 4 g/10 min; density: 0.92 g/cm$^3$; melting point: 110° C.) were dry blended at a ratio of 70:30 by weight in a tumbling mixer for 3 minutes. The blend was melt-kneaded and pelletized in the same manner as in (3) above to obtain pellets for a heat-sealable resin layer (III).

(5) Laminating

A resin composition (C) consisting of 51.5% of a propylene homopolymer MA-3, 3.5% of high density polyethylene HJ580, 42% of calcium carbonate powder having a particle size of 1.5 µm and 3% of titanium oxide powder having a particle size of 0.8 µm, the pellets for interlayer (II) prepared in (3) above, and the pellets for heat-sealable resin layer (III) prepared in (4) above were melt-kneaded at 230° C. in the respective extruders, fed to a co-extrusion die, superposed in the die at 230° C., and co-extruded on the core layer (A) side of the surface layer (B)/core layer (A) laminate with the heat-sealable resin layer (III) as a top layer. The laminate film was passed through an embossing metal roll and a back-up rubber roll to give an embossed pattern (150 lines/inch at 0.17 mm interval; inverted gravure type) to the heat-sealable resin layer (III).

The resulting 5-layered laminate film (B/A/C/II/III) was delivered to a tenter oven, where it was re-heated to 155° C. and laterally stretched 7 times. The stretched film was heat-set at 164° C., chilled to 55° C., and trimmed. The surface layer (B) was subjected to a corona discharge treatment at 70 W/m$^2$/min. The resulting 5-layered laminate film had a density of 0.79 g/cm$^3$ and a total thickness of 100 µm (B/A/C/II/III=30/40/25/3/2 µm). The average surface roughness (Ra) on the heat-sealable resin layer (III) side was 2.8 μm as measured with a surface roughness meter (Surfcoader SE-30, supplied by Kosaka Laboratory Ltd.).

After 6 hours from the start of extrusion, accumulation of resin-like stain was not at all observed around the tip of the die.

(6) Printing and In-mold Decorating

The surface layer (B) of the laminate film was offset printed in an atmosphere of 25° C. and 40% RH. Since static build-up in the stack of films was suppressed, the films were smoothly fed and discharged, causing no suspension of the printing operation.

The printed film was cut and blanked to prepare 70 mm wide and 90 mm long labels (1) for in-mold decorating. The surface resistivity on the heat-sealable resin layer (III) side of the label was measured. The results obtained are shown in Table 1.

The label (1) was fixed by suction on a half of a blow molding split mold with its printed side in contact with the mold by means of an automatic label feeder. A parison of high density polyethylene (melting point: 134° C.) was extruded at 200° C. into the cavity, the mold was closed, and compressed air was fed into the hot parison at 4.2 kg/cm$^2$ to inflate the parison and bring it into intimate contact with the mold to produce a blown container with the label fused thereto. The mold was cooled and opened to remove the labeled container. The suitability of the label to insertion into the mold, occurrence of blistering, and the adhesive strength of the label are shown in Table 1.

The label on the labeled container was free from print fading, shrinkage or blisters. The adhesive strength between the label and the container was 540 g/mm.

Examples 2 to 5 and Comparative Examples 1 to 5

Labels for in-mold decorating were obtained in the same manner as in Example 1, except that the throughputs of the extruders for the interlayer (II) and the heat-sealable resin layer (III) were changed to change the thicknesses of these layers as shown in Table 1. The results of evaluation of the resulting labels are shown in Table 1.

Example 6

Labels for in-mold decorating were obtained in the same manner as in Example 1, except that the pellets for the interlayer (II) were prepared as follows. The results of evaluation of the resulting label are shown in Table 1.

A mixture consisting of 60% of the same ethylene-1-hexene copolymer as used in Example 1 and 28% of the same high pressure processed low density polyethylene as used in Example 1 (total: 88%) was dry blended with 10% of polyether ester amide (b2) prepared in Preparation Example 2, and 2% of an ionomer Himilan 1605 (having Na ions, available from Du Pont-Mitsui Polychemicals Co., Ltd.) in a tumbling mixer for 3 minutes. The blend was kneaded in a vented twin-screw extruder set at 230° C., extruded through a die into strands, which were cut into pellets.

Example 7

Labels for in-mold decorating were obtained in the same manner as in Example 1, except that the pellets for the interlayer (II) were prepared as follows. The results of evaluation of the resulting label are shown in Table 1.

A mixture consisting of 60% of the same ethylene-1-hexene copolymer as used in Example 1 and 27.6% of the same high pressure processed low density polyethylene as used in Example 1 (total: 87.6%) was dry blended with 10% of polyether ester amide (b1) prepared in Preparation Example 1, 0.4% of sodium phosphate as a metal salt, and 2% of an ionomer Himilan 1706 (having Zn ions, available from Du Pont-Mitsui Polychemicals Co., Ltd.) in a tumbling mixer for 3 minutes. The blend was kneaded in a vented twin-screw extruder set at 230° C., extruded through a die into strands, which were cut into pellets.

Example 8

Labels for in-mold decorating were obtained in the same manner as in Example 1, except that the pellets for the interlayer (II) were prepared as follows. The results of evaluation of the resulting label are shown in Table 1.

A mixture consisting of 60% of the same ethylene-1-hexene copolymer as used in Example 1 and 27.6% of the same high pressure processed low density polyethylene as used in Example 1 (total: 87.6%) was dry blended with 10% of polyether ester amide (b1) prepared in Preparation Example 1, 0.4% of sodium phosphate as a metal salt, and 2% of an ionomer Himilan 1706 (having Zn ions, available from Du Pont-Mitsui Polychemicals Co., Ltd.) in a tumbling mixer for 3 minutes. The blend was kneaded in a twin-screw vented extruder set at 230° C., extruded through a die into strands, which were cut into pellets.

Example 9

Labels for in-mold decorating were obtained in the same manner as in Example 1, except that the pellets for the interlayer (II) were prepared as follows. The results of evaluation of the resulting label are shown in Table 1.

A mixture consisting of 46% of the same ethylene-1-hexene copolymer as used in Example 1, 16% of the same high pressure processed low density polyethylene as used in Example 1 and 10% of linear low density polyethylene (MFR: 5 g/10 min; density: 0.935; melting point: 125° C.) (total: 72%) was dry blended with 17% of polyether ester amide (b3) prepared in Preparation Example 3, 6% of a polyamide resin (UBE Nylon 6), and acid-modified low-molecular polyethylene (f) prepared as follows in a tumbling mixer for 3 minutes. The blend was kneaded in a vented twin-screw extruder set at 230° C., extruded through a die into strands, which were cut into pellets. The results of evaluation of the resulting label are shown in Table 1.

Preparation of Acid-modified Low-molecular Polyethylene (f):

A mixture of 95 parts of low-molecular polyethylene having a number average molecular weight of 3,000 and a density of 0.92 g/cm$^3$ which was obtained by thermal degradation of high-molecular polyethylene, 5 parts of maleic anhydride, and 60 parts of xylene was melted at 140° C. in a nitrogen stream. A 50% xylene solution of 1.5 parts of t-butyl peroxide was added dropwise to the melt over 15 minutes, followed by allowing the mixture to react for 1 hour. After completion of the reaction, the solvent was evaporated to give an acid-modified low-molecular polyethylene, which had an acid value of 25.7 and a number average molecular weight of 5,000.

Comparative Example 6

Labels for in-mold decorating were prepared in accordance with the teaching of JP-A-11-35288. The resulting label was evaluated in the same manner as in the foregoing Examples. The results obtained are shown in Table 1.

Example 10

The same resin composition (A) for core layer, resin composition (B) for surface layer, pellets for interlayer (II) and pellets for heat-sealable resin layer (III) as used in Example 1 were melt-kneaded in the respective extruders set at 250° C., 240° C., 230° C., and 230° C., respectively, superposed in a co-extrusion die in the order of B/A/II/III, co-extruded and chilled to 70° C. to obtain a four-layered laminate film. The laminate film was heated to 120° C. and passed through an embossing metal roll and a back-up rubber roll to give an embossed pattern (200 lines/inch at 0.13 mm interval; inverted gravure type) to the heat-sealable resin layer (III). The embossed film was longitudinally stretched 6 times at 120° C. between rolls, cooled to 50° C. and trimmed. The surface layer (B) of the laminate film was subjected to a corona discharge treatment at 50 W/m$^2$/min. The resulting four-layered laminate film had a density of 0.91 g/cm$^3$ and a total thickness of 90 μm (B/A/II/III =5/80/3/2 μm). The average surface roughness (Ra) on the heat-sealable resin layer (III) side was 2.4 μm. The results of evaluation are shown in Table 1.

Example 11
(1) Preparation of Core Layer (A)

A resin composition (A) consisting of 88% of propylene homopolymer Novatec PP MA-8, available from Japan Polychem Corporation (melting point: 164° C.), 10% of high density polyethylene Novatec HD HJ580, available from Japan Polychem Corporation (melting point: 134° C.; density: 0.960 g/cm$^3$) and 2% of calcium carbonate powder having a particle size of 1.5 μm was melt-kneaded in an extruder and extruded from a die at 250° C. into a sheet. The extruded sheet was chilled to about 50° C. The sheet was heated to about 153° C. and longitudinally stretched four times by means of rolls having different peripheral speeds to obtain a uniaxially stretched film (A).
(2) Preparation of Surface Layer (B)/Core Layer (A) Laminate A resin composition (B) consisting of 85% of propylene homopolymer Novatec PP MA-3, available from Japan Polychem Corporation (melting point: 165° C.), 5% of high density polyethylene HJ580 (density: 0.950 g/cm$^3$) and 10% of calcium carbonate powder having a particle size of 1.5 μm was melt-kneaded in an extruder at 240° C. and extruded from a die into a sheet on the uniaxially stretched film (A) to obtain a surface layer (B)/core layer (A) laminate.
(3) Laminating A resin composition (C) consisting of 88% of a propylene homopolymer MA-3, 10% of high density polyethylene HJ580, and 2% of calcium carbonate powder having a particle size of 1.5 μm, the pellets for interlayer (II) prepared in Example 1, and the pellets for heat-sealable resin layer (III) prepared in Example 1 were melt-kneaded at 230° C. in the respective extruders, fed to a co-extrusion die, superposed in the die at 230° C., and co-extruded on the core layer (A) side of the surface layer (B)/core layer (A) laminate with the heat-sealable resin layer (III) as a top layer. The laminate film was embossed in the same manner as in Example 1.

The resulting 5-layered laminate film (B/A/C/II/III) was re-heated to 160° C. and laterally stretched 7 times in a tenter oven, followed by heat setting at 164° C., chilled to 55° C., and trimmed. The surface layer (B) was subjected to a corona discharge treatment at 70 W/m$^2$/min. The resulting 5-layered laminate film had a density of 0.90 g/cm$^3$ and a total thickness of 80 μm (B/A/C/II/III=20/40/15/3/2 μm). The average surface roughness (Ra) on the heat-sealable resin layer (III) side was 2.4 μm. The laminate film had an opacity of 14% as measured in accordance with JIS P8138. The results of evaluation are shown in Table 1.

Example 12

A five-layered laminate film (B/A/C/II/III =20/40/15/3/2 μm) was prepared in the same manner as in Example 11, except that the composition (A) for core layer consisted of 90% of the propylene homopolymer MA-8 and 10% of high density polyethylene HJ580. The average surface roughness (Ra) of the heat-sealable resin layer (III) side was 2.3 μm. The laminate film had an opacity of 10% as measured in accordance with JIS P8138. The results of evaluation are shown in Table 1.

Example 13

A four-layered laminate film (B/A/II/III=5/70/3/2 μm) was obtained in the same manner as in Example 10, except that the same resin composition (A) for core layer as used in Example 12, the resin composition (B) for surface layer, the pellets for interlayer (II), and the pellets for heat-sealable resin layer were melt-kneaded in the respective extruders set at 250° C., 240° C., 230° C., and 230° C., respectively, superposed in a co-extrusion die in the order of B/A/II/III, extruded into a laminate sheet, and chilled to 70° C. to obtain a four-layered sheet. The resulting four-layered uniaxially stretched film had a density of 0.90 g/cm$^3$ and a total thickness of 80 μm (B/A/II/III=5/70/3/2 μm). The average surface roughness (Ra) of the heat-sealable resin layer (III) side was 2.3 μm. The laminate film had an opacity of 9% as measured in accordance with JIS P8138. The results of evaluation are shown in Table 1.

In Table 2 below are shown the composition, the stretching directionality ("uni" stands for "uniaxial", and "bi" stands for "biaxial") and the thickness of each layer and the opacity of the laminate film.

|  | Example | | | | | | | | | | | | | Comparative Example | | | | | |
|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 1 | 2 | 3 | 4 | 5 | 6 |
| Thickness of Interlayer (II) ($\mu$m) | 3 | 4 | 15 | 1 | 2 | 3 | 3 | 3 | 3 | 3 | 3 | 3 | 3 | 5 | 4 | 25 | 02 | 2 | 5 |
| Thinkness of Heat-sealable Resin Layer ($\mu$m) | 2 | 1 | 2 | 4 | 15 | 2 | 2 | 2 | 2 | 2 | 2 | 2 | 2 | 0 | 02 | 2 | 4 | 25 | 0 |
| Film Defect due to resin-like stain | A | B | A | A | A | A | A | A | A | A | A | A | A | C | C | A | A | A | C |
| Suitability to Feed and Discharge in Offset Printing | A | A | A | A | A | A | A | A | A | A | A | A | A | A | A | A | B | A | A |
| Surface Resistivity* ($\Omega$/square) | 9E+11 | 1E+12 | 5E+11 | 6E+12 | 4E+12 | 2E+11 | 8E+10 | 2E+10 | 4E+12 | 5E+11 | 2E+12 | 3E+12 | 1E+12 | 6E+11 | 8E+11 | 5E+10 | 3E+15 | 3E+13 | 1E+12 |
| Suitability to Insertion into Mold | A | A | B | A | B | A | A | A | A | A | A | A | A | A | A | C | C | C | A |
| Adhesive Strength to Container (g/15 mm) | 540 | 530 | 710 | 620 | 830 | 520 | 510 | 500 | 580 | 600 | 440 | 450 | 410 | 430 | 390 | 790 | 670 | 890 | 470 |

*Measured on the heat-sealable resin layer side.

TABLE 2

| | Surface Layer (B) | | | | | Core Layer (A) | | | | | Back Layer (C) | | | | | Interlayer (II) | | Heat-Sealable Resin Layer (III) | | Opacity (%) |
|---|---|---|---|---|---|---|---|---|---|---|---|---|---|---|---|---|---|---|---|---|
| | MA-3 | HJ 580 | CaCO₃ | TiO₂ | Stretch | Thickness (μm) | MA-3 | HJ 580 | CaCO₃ | Stretch | Thickness (μm) | MA-3 | HJ 580 | CaCO₃ | TiO₂ | Stretch | Thickness (μm) | Stretch | Thickness (μm) | Stretch | Thickness (μm) | |
| Exs. 1, 6–9 | 51.5 | 3.5 | 42 | 3 | uni | 30 | 67 | 10 | 23 | bi | 40 | 51.5 | 3.5 | 42 | 3 | uni | 25 | uni | 3 | uni | 2 | 95 |
| Ex. 2 | " | " | " | " | " | " | " | " | " | " | " | " | " | " | " | " | " | " | 4 | " | 1 | 95 |
| Ex. 3 | " | " | " | " | " | " | " | " | " | " | " | " | " | " | " | " | " | " | 15 | " | 2 | 95 |
| Ex. 4 | " | " | " | " | " | " | " | " | " | " | " | " | " | " | " | " | " | " | 1 | " | 4 | 95 |
| Ex. 5 | " | " | " | " | " | " | " | " | " | " | " | " | " | " | " | " | " | " | 2 | " | 15 | 95 |
| Comp. Ex. 1 | " | " | " | " | " | " | " | " | " | " | " | " | " | " | " | " | " | " | 5 | " | 0 | 95 |
| Comp. Ex. 2 | " | " | " | " | " | " | " | " | " | " | " | " | " | " | " | " | " | " | 4 | " | 0.3 | 95 |
| Comp. Ex. 3 | " | " | " | " | " | " | " | " | " | " | " | " | " | " | " | " | " | " | 25 | " | 2 | 95 |
| Comp. Ex. 4 | " | " | " | " | " | " | " | " | " | " | " | " | " | " | " | " | " | " | 0.2 | " | 4 | 95 |
| Comp. Ex. 5 | " | " | " | " | " | " | " | " | " | " | " | " | " | " | " | " | " | " | 2 | " | 25 | 95 |
| Comp. Ex. 6 | | | | | | | | | | Example 4 of JP-A-11-352888 | | | | | | | | | | | | |
| Ex. 10 | 51.5 | 3.5 | 42 | 3 | uni | 5 | 67 | 10 | 23 | uni | 80 | — | — | — | — | — | — | uni | 3 | uni | 2 | 92 |
| Ex. 11 | 85 | 5 | 10 | — | " | 20 | 88 | 10 | 2 | bi | 40 | — | 10 | 2 | — | uni | 15 | " | 3 | " | 2 | 14 |
| Ex. 12 | 85 | 5 | 10 | — | " | 20 | 90 | 10 | — | bi | 40 | — | 10 | 2 | — | uni | 15 | " | 3 | " | 2 | 10 |
| Ex. 13 | 85 | 5 | 10 | — | " | 5 | 90 | 10 | — | uni | 70 | — | — | — | — | — | — | " | 3 | " | 2 | 9 |

MA-3: Propylene homopolymer from Japan Polychem Corporation
MA-8: Propylene homopolymer from Japan Polychem Corporation
HJ580: High density polyethylene from Japan Polychem Corporation
CaCO₃: Particle size: 1.5 μm; TiO₂: Particle size: 0.8 μm The present invention provides a label for in-mold decorating which can be manufactured without causing development of resin-like stain or contamination of rolls, which are free from inconveniences due to insufficient antistatic properties in printing, cutting, blanking, and inserting into a mold irrespective of the working environment, and which exhibits high adhesive strength to a molded container.

This application is based on Japanese patent applications JP 2000-221735, filed Jul. 24, 2000, and JP 2001-026954, filed Feb. 2, 2001, the entire contents of each of which are hereby incorporated by reference, the same as if set forth at length.

Obviously, numerous modifications and variations of the present invention are possible in light of the above teachings. It is therefore to be understood that within the scope of the appended claims, the invention may be practiced otherwise than as specifically described herein.

What is claimed is:

1. A label for in-mold decorating, comprising:
   (I) a thermoplastic resin film base layer;
   (II) an interlayer overlying said base layer and comprising:
      (a) a thermoplastic resin composition, and
      (b) at least one antistatic agent; and
   (III) a heat-sealable resin layer overlying said interlayer.

2. The label according to claim 1, wherein said heat-sealable resin layer (III) comprises an embossed surface.

3. The label according to claim 1, wherein said antistatic agent comprises a polyamide copolymer.

4. The label according to claim 1, wherein said antistatic agent comprises a polyether ester amide.

5. The label according to claim 1, wherein said interlayer comprises:
   (a) 50 to 95% by weight of a thermoplastic resin as the thermoplastic resin composition;
   (b) 5 to 35% by weight of a polyether ester amide as the antistatic agent; and
   (c) 0 to 10% by weight of a polyamide resin as the antistatic agent.

6. The label according to claim 5, wherein the thermoplastic resin (a) is a polyolefin resin.

7. The label according to claim 5, wherein said thermoplastic resin composition further comprises (d) 0.01 to 5% by weight of a metal salt.

8. The label according to claim 5, wherein said thermoplastic resin composition further comprises (e) 0.5 to 20% by weight of an ionomer.

9. The label according to claim 7, wherein said thermoplastic resin composition further comprises (e) 0.5 to 20% by weight of an ionomer.

10. The label according to claim 5, wherein said thermoplastic resin composition further comprises (f) 1 to 20% by weight of modified low-molecular weight polyethylene.

11. The label according to claim 7, wherein said thermoplastic resin composition further comprises (f) 1 to 20% by weight of modified low-molecular weight polyethylene.

12. The label according to claim 8, wherein said thermoplastic resin composition further comprises (f) 1 to 20% by weight of modified low-molecular weight polyethylene.

13. The label according to claim 9, wherein said thermoplastic resin composition further comprises (f) 1 to 20% by weight of modified low-molecular weight polyethylene.

14. The label according to claim 1, wherein said thermoplastic resin composition comprises a polyolefin resin.

15. The label according to claim 1, wherein said thermoplastic resin composition comprises (d) 0.01 to 5% by weight of a metal salt.

16. The label according to claim 1, wherein said thermoplastic resin composition further comprises (e) 0.5 to 20% by weight of an ionomer.

17. The label according to claim 1, wherein said thermoplastic resin composition further comprises (f) 1 to 20% by weight of modified low-molecular weight polyethylene.

18. The label according to claim 1, wherein said heat-sealable resin layer (III) comprises a polyethylene resin having a crystallinity of 10 to 60%, a number average molecular weight of 10,000 to 40,000, and a melting point of 50 to 130° C.

19. The label according to claim 1, wherein said heat-sealable resin layer (III) comprises a polyethylene resin having a crystallinity of 10 to 60%.

20. The label according to claim 1, wherein said heat-sealable resin layer (III) comprises a polyethylene resin having a number average molecular weight of 10,000 to 40,000.

21. The label according to claim 1, wherein said heat-sealable resin layer (III) comprises a polyethylene resin having a melting point of 50 to 130° C.

22. The label according to claim 1, wherein said interlayer (II) has a thickness of 0.5 to 20 $\mu$m, and said heat-sealable resin layer (III) has a thickness of 0.5 to 20 $\mu$m.

23. The label according to claim 1, wherein said interlayer (II) has a thickness of 0.5 to 20 $\mu$m.

24. The label according to claim 1, wherein said heat-sealable resin layer (III) has a thickness of 0.5 to 20 $\mu$m.

25. The label according to claim 1, which has a surface resistivity of $1 \times 10^9$ to $1 \times 10^{14} \Omega$/square on a side of said heat-sealable resin layer (III) opposite to a side thereof facing said interlayer (II).

26. The label according to claim 1, further comprising at least one selected from the group consisting of an inorganic fine powder, an organic filler, and combinations thereof.

27. The label according to claim 1, wherein said base layer (I) further comprises at least one selected from the group consisting of an inorganic fine powder, an organic filler, and combinations thereof.

28. A labeled, resin molded article, comprising the label according to claim 1 integrally adhered thereto by thermal fusion bonding.

29. A labeled, resin molded article, comprising the label according to claim 1.

* * * * *